United States Patent
Umemoto

(10) Patent No.: US 11,167,993 B2
(45) Date of Patent: Nov. 9, 2021

(54) SURFACE-MODIFIED NANODIAMOND, LIQUID DISPERSION INCLUDING SURFACE-MODIFIED NANODIAMOND, AND RESIN DISPERSION

(71) Applicant: DAICEL CORPORATION, Osaka (JP)

(72) Inventor: Kouichi Umemoto, Himeji (JP)

(73) Assignee: DAICEL CORPORATION, Osaka (JP)

(*) Notice: Subject to any disclaimer, the term of this patent is extended or adjusted under 35 U.S.C. 154(b) by 76 days.

(21) Appl. No.: 16/607,048

(22) PCT Filed: Jun. 6, 2018

(86) PCT No.: PCT/JP2018/021690
§ 371 (c)(1),
(2) Date: Oct. 21, 2019

(87) PCT Pub. No.: WO2018/235599
PCT Pub. Date: Dec. 27, 2018

(65) Prior Publication Data
US 2020/0189916 A1    Jun. 18, 2020

(30) Foreign Application Priority Data

Jun. 19, 2017  (JP) .............................. JP2017-119544

(51) Int. Cl.
| C08K 3/04 | (2006.01) |
| C08K 9/06 | (2006.01) |
| C09C 3/12 | (2006.01) |
| C01B 32/28 | (2017.01) |

(52) U.S. Cl.
CPC ................ *C01B 32/28* (2017.08); *C08K 3/04* (2013.01); *C08K 9/06* (2013.01)

(58) Field of Classification Search
CPC ......... C09C 1/44; C09C 3/12; C01P 2004/64; B82Y 30/00; B82Y 40/00; C01B 32/02
See application file for complete search history.

(56) References Cited

U.S. PATENT DOCUMENTS

| 9,884,767 | B2 | 2/2018 | Myllymäki | |
| 2011/0049056 | A1* | 3/2011 | Wyndham | B01J 20/288 |
| | | | | 210/656 |
| 2012/0003479 | A1 | 1/2012 | Hsin et al. | |
| 2015/0218921 | A1* | 8/2015 | Suresh | E21B 43/20 |
| | | | | 166/305.1 |
| 2016/0102188 | A1* | 4/2016 | Myllymaki | C08L 77/06 |
| | | | | 252/75 |
| 2016/0115033 | A1 | 4/2016 | Myllymäki | |
| 2018/0118575 | A1 | 5/2018 | Myllymäki | |

FOREIGN PATENT DOCUMENTS

| JP | 2012-17225 A | 1/2012 |
| JP | 2016-520035 A | 7/2016 |

OTHER PUBLICATIONS

International Search Report (Form PCT/ISA/210) for International Application No. PCT/JP2018/021690, dated Aug. 28, 2018, with English translation.
Written Opinion of the International Searching Authority (Form PCT/ISA/237) for International Application No. PCT/JP2018/021690, dated Aug. 28, 2018, with English translation.
(Continued)

*Primary Examiner* — Karuna P Reddy
(74) *Attorney, Agent, or Firm* — Birch, Stewart, Kolasch & Birch, LLP

(57) ABSTRACT

The present invention is to provide a surface-modified nanodiamond having excellent affinity for an organic solvent and a resin and having high dispersibility in an organic solvent and in a resin. The surface-modified nanodiamond according to an embodiment of the present invention has a structure in which a surface of a nanodiamond particle is modified by a group represented by Formula (1) below. In Formula (1), $R^1$ represents an aliphatic hydrocarbon group having 6 or more carbons. $R^2$ and $R^3$ may be the same or different and are each a hydrogen atom, an aliphatic hydrocarbon group having from 1 to 3 carbons, or a group represented by Formula (2) below.

[Chemical Formula 1]

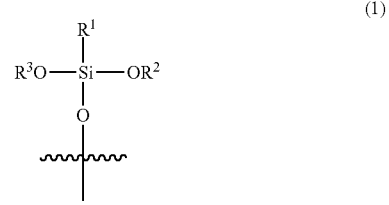

[Chemical Formula 2]

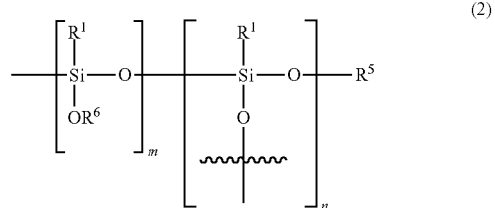

9 Claims, 1 Drawing Sheet

(56) References Cited

OTHER PUBLICATIONS

Dolmatov, "Polymer-Diamond Composites Based on Detonation Nanodiamonds. Part 2," Journal of Superhard Materials, vol. 29. No. 2, 2007, (Apr. 1, 2007) pp. 65-75, XP055779918.
Extended European Search Report, dated Mar. 11, 2021, for corresponding European Application No. 18819722.2.
Hui et al., "Two-photon Fluorescence Correlation Spectroscopy of Lipid-Encapsulated Fluorescent Nanodiamonds in Living Cells," Optics Express, vol. 18, No. 6, Mar. 15, 2010 (published Mar. 10, 2010), pp. 5896-5905, XP055773850.
Liang et al., "A General Procedure to Functionalize Agglomerating Nanoparticles Demonstrated on Nanodiamond," ACS Nano, vol. 3, No. 8, Published online Jul. 14, 2009, pp. 2288-2296, XP055197961.

\* cited by examiner

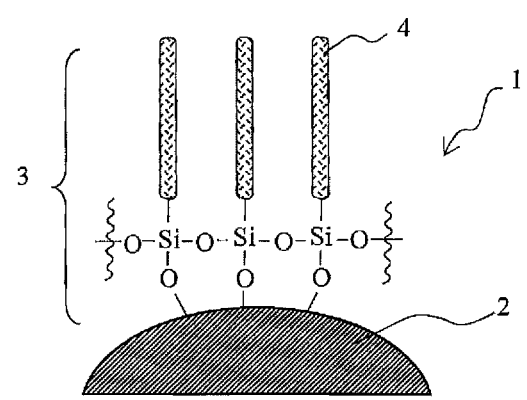

SURFACE-MODIFIED NANODIAMOND, LIQUID DISPERSION INCLUDING SURFACE-MODIFIED NANODIAMOND, AND RESIN DISPERSION

TECHNICAL FIELD

The present invention relates to a surface-modified nanodiamond, a liquid dispersion including the surface-modified nanodiamond, and a resin dispersion including the surface-modified nanodiamond. The present application claims priority to JP 2017-119544 A filed in Japan on Jun. 19, 2017, the content of which is incorporated herein.

BACKGROUND ART

Nano-sized fine substances are known to have novel characteristics that cannot be achieved in a bulk state. For example, nanodiamond particles (i.e. nano-sized diamond particles) have mechanical strength, high refractive index, thermal conductivity, insulating properties, antioxidation properties, promoting action of crystallization of resins, and the like. However, nanodiamond particles typically have large proportions of surface atoms, a total van der Waals force that can act between surface atoms of adjacent particles is strong, and aggregation tends to occur. In addition, in the case of nanodiamond particles, Coulomb interaction between crystalline surfaces of adjacent crystals may contribute to agglutination, which is a phenomenon where particles are significantly firmly clustered. Thus, it was extremely difficult to disperse nanodiamond particles to a state of primary particles in an organic solvent or in a resin. Aggregation is thus suppressed by imparting dispersibility to nanodiamond particles through modifying surfaces of the nanodiamond particles.

For example, Patent Document 1 describes modification of a nanodiamond particle surface with a trimethylsilyl group.

CITATION LIST

Patent Document

Patent Document 1: JP 2012-17225 A

SUMMARY OF INVENTION

Technical Problem

However, it was found that, in a nanodiamond of which the surface is modified by a trimethylsilyl group, the chain length of the methyl group is too short and fails to achieve steric hindrance sufficient to prevent aggregation of nanodiamonds. Thus, dispersion of the nanodiamond in an organic solvent is difficult. It was also found that, even in the case where nanodiamonds are dispersed in an organic solvent, if powder is then formed by vaporization of the organic solvent, it becomes significantly difficult to disperse the nanodiamonds again in the organic solvent. That is, it was found that re-dispersibility is poor.

Therefore, an object of the present invention is to provide a surface-modified nanodiamond having excellent affinity for an organic solvent and a resin and having high dispersibility in an organic solvent and in a resin.

Another object of the present invention is to provide a surface-modified nanodiamond having excellent affinity for an organic solvent and a resin, having high dispersibility in an organic solvent and in a resin, and having re-dispersibility.

Another object of the present invention is to provide a nanodiamond liquid dispersion in which the surface-modified nanodiamonds are highly dispersed in an organic solvent.

Another object of the present invention is to provide a method of producing the nanodiamond liquid dispersion.

Another object of the present invention is to provide a resin dispersion in which the surface-modified nanodiamonds are highly dispersed in a resin.

Solution to Problem

As a result of diligent research to solve the problems described above, the present inventors found the following.

1. A surface-modified nanodiamond formed by reacting a silane coupling agent having an aliphatic hydrocarbon group having 6 or more carbons with a nanodiamond particle can exhibit high dispersibility because aggregation of the nanodiamond particles is suppressed due to steric hindrance of a surface modifying group derived from the silane coupling agent.

2. Since the surface modifying group derived from the silane coupling agent has excellent affinity for an organic solvent and a resin, the nanodiamond having the surface modifying group can exhibit high dispersibility in an organic solvent and in a resin.

3. Among the silane coupling agent, in the case where a silane coupling agent having an aliphatic hydrocarbon group having 14 or more carbons in particular is used, the formed surface-modified nanodiamond achieves excellent dispersibility and re-dispersibility.

4. For the production of the surface-modified nanodiamond having high dispersibility, it is important to form a surface modifying group by reacting a silane coupling agent with the nanodiamond particle while ultrasonic treatment is performed in the presence of a grinding media such as zirconia beads.

The present invention has been completed based on these findings.

That is, the present invention provides a surface-modified nanodiamond having a structure in which a surface of a nanodiamond particle is modified by a group represented by Formula (1) below.

[Chemical Formula 1]

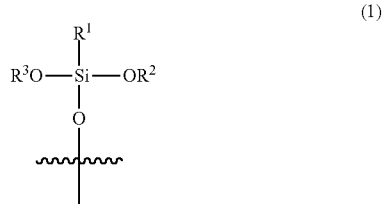

In Formula (1), $R^1$ represents an aliphatic hydrocarbon group having 6 or more carbons, an atomic bond indicated by a wavy line in the formula bonds to the surface of the nanodiamond particle, and $R^2$ and $R^3$ may be the same or different and are each a hydrogen atom, an aliphatic hydrocarbon group having from 1 to 3 carbons, or a group represented by Formula (2) below.

[Chemical Formula 2]

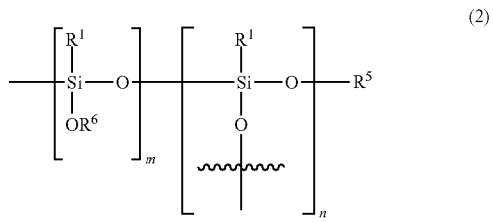

In Formula (2), $R^1$ is as described above, $R^5$ and $R^6$ may be the same or different and each represent a hydrogen atom or an aliphatic hydrocarbon group having from 1 to 3 carbons, m and n may be the same or different and each represent an integer of 0 or greater, and note that an atomic bond extending toward left from a silicon atom bonds to an oxygen atom, and an atomic bond indicated by a wavy line bonds to the surface of the nanodiamond particle.

The present invention also provides a nanodiamond liquid dispersion including an organic solvent and the surface-modified nanodiamonds.

The present invention also provides the nanodiamond liquid dispersion, in which the organic solvent is aromatic hydrocarbon.

The present invention also provides the nanodiamond liquid dispersion, in which a median diameter of the surface-modified nanodiamonds included in the organic solvent is 100 nm or less.

The present invention also provides a method of producing a nanodiamond liquid dispersion, the method including:
while nanodiamond particles in an organic solvent are subjected to ultrasonic treatment in the presence of a grinding media, reacting a compound represented by Formula (3) below with the nanodiamond particles to obtain the nanodiamond liquid dispersion described above.

[Chemical Formula 3]

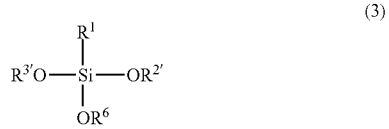

In Formula (3), $R^1$ represents an aliphatic hydrocarbon group having 6 or more carbons, and $R^{2\prime}$, $R^{3\prime}$, and $R^6$ may be the same or different and each represent an aliphatic hydrocarbon group having from 1 to 3 carbons.

The present invention also provides a resin dispersion including a resin and the surface-modified nanodiamonds.

Advantageous Effects of Invention

Since the surface-modified nanodiamond according to an embodiment of the present invention has a surface modifying group derived from a silane coupling agent having an aliphatic hydrocarbon group having 6 or more carbons on its surface, the surface-modified nanodiamond exhibits excellent dispersibility in an organic solvent and in a resin.

In particular, a surface-modified nanodiamond having a surface modifying group derived from a silane coupling agent having an aliphatic hydrocarbon having 14 or more carbons exhibits excellent dispersibility and re-dispersibility in an organic solvent and in a resin.

Furthermore, the nanodiamond liquid dispersion according to an embodiment of the present invention formed by allowing the surface-modified nanodiamonds to be highly dispersed in an organic solvent can be suitably used as an imparting agent that imparts the characteristics of the nanodiamond (e.g. mechanical strength, high refractive index, heat conductivity, insulating properties, antioxidation properties, crystallization promoting action, and the like) to a resin or the like, or as an antifriction agent or a lubricant applied to a sliding member or the like of a machine component (e.g. automobiles, aircrafts, and the like).

Furthermore, by the production method according to an embodiment of the present invention, the nanodiamond liquid dispersion can be efficiently produced.

Furthermore, the resin dispersion formed by allowing the surface-modified nanodiamonds having excellent dispersibility as described above to be dispersed in a resin can be suitably used as a material for forming various products that are required to have characteristics of the nanodiamond because, in the case where the resin is transparent, the resin dispersion can exhibit characteristics of the nanodiamond while the transparency is maintained.

BRIEF DESCRIPTION OF DRAWINGS

FIG. 1 is an enlarged schematic diagram illustrating an example of the surface-modified nanodiamond according to an embodiment of the present invention. The surface-modified nanodiamond 1 has a surface modifying group 3 including a long-chain aliphatic hydrocarbon group 4 on a surface of a nanodiamond particle 2 (illustrated partially).

DESCRIPTION OF EMBODIMENTS

Surface-Modified Nanodiamond

The surface-modified nanodiamond according to an embodiment of the present invention (hereinafter, nanodiamond may be also referred to as "ND") has a structure in which a surface of a nanodiamond particle is modified by a group represented by Formula (1) below (=group derived from a silane coupling agent described below).

[Chemical Formula 4]

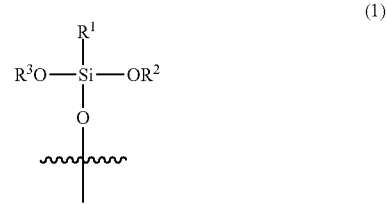

In Formula (1), $R^1$ represents an aliphatic hydrocarbon group having 6 or more carbons, An atomic bond indicated by a wavy line in the formula bonds to the surface of the nanodiamond particle, and $R^2$ and $R^3$ may be the same or different and are each a hydrogen atom, an aliphatic hydrocarbon group having from 1 to 3 carbons, or a group represented by Formula (2) below.

[Chemical Formula 5]

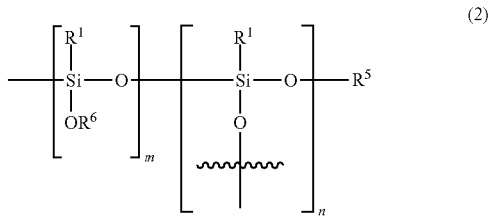

(2)

In Formula (2), $R^1$ is as described above. $R^5$ and $R^6$ may be the same or different and each represent a hydrogen atom or an aliphatic hydrocarbon group having from 1 to 3 carbons. m and n may be the same or different and each represent an integer of 0 or greater. Note that an atomic bond extending toward left from a silicon atom bonds to an oxygen atom. Furthermore, an atomic bond indicated by a wavy line bonds to the surface of the nanodiamond particle.

$R^1$ is a long-chain aliphatic hydrocarbon group and, specifically, is an aliphatic hydrocarbon group having 6 or more carbons, Examples of the aliphatic hydrocarbon group having 6 or more carbons include straight-chain or branched alkyl groups, such as hexyl, octyl, 2-methylhexyl, decyl, isodecyl, lauryl, myristyl, isomyristyl, butyloctyl, isocetyl, hexyldecyl, stearyl, isostearyl, octyldecyl, octyldodecyl, and isobehenyl groups; straight-chain or branched alkenyl groups, such as 2-hexenyl, 7-octenyl, 9-decenyl, 11-dodecenyl, and oleyl groups; and straight-chain or branched alkynyl groups, such as decynyl, pentadecynyl, and octadecynyl groups. In an embodiment of the present invention, among these, from the viewpoint of imparting higher dispersibility, an aliphatic hydrocarbon group having 10 or more carbons is preferred, and an aliphatic hydrocarbon group having 14 or more carbons is particularly preferred. Note that the upper limit of the number of carbons of the aliphatic hydrocarbon group is, for example, 25, and preferably 20. Furthermore, among these, the aliphatic hydrocarbon group is preferably a straight-chain or branched alkyl group or alkenyl group, and particularly preferably a straight-chain or branched alkyl group.

Examples of the aliphatic hydrocarbon group having from 1 to 3 carbons in $R^2$, $R^3$, $R^5$, and $R^6$ include straight-chain or branched alkyl groups, such as methyl, ethyl, propyl, and isopropyl groups; straight-chain or branched alkenyl groups, such as vinyl and allyl groups; and alkynyl groups, such as an ethynyl group and a propynyl group. In an embodiment of the present invention, among these, a straight-chain or branched alkyl group is preferred.

m and n are each the number of constituent units shown in each parenthesis, may be the same or different, and each represent an integer of 0 or greater. In the case where m and n are each 2 or greater, the bonding manner of two or more constituent units may be any of random, alternate, or block.

The ND particle constituting the surface-modified ND preferably includes a primary particle of the ND. In addition, a secondary particle in which a few to dozens of the primary particles aggregate may be included. Furthermore, on the surface of the surface-modified ND, besides the group represented by Formula (1) above, for example, one type or two or more types of groups represented by Formula (1') below (i.e. group derived from a silane coupling agent described below) and/or other surface functional groups (e.g. an amino group, a hydroxy group, and a carboxyl group) may be included.

[Chemical Formula 6]

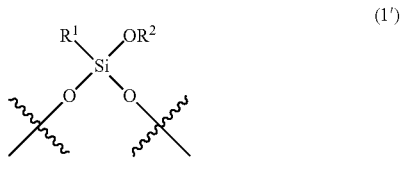

(1')

In the formula, $R^1$ and $R^2$ are the same as those described above. An atomic bond indicated by a wavy line in the formula bonds to the surface of the nanodiamond particle.

As the ND particles, for example, detonation ND (i.e. ND produced by detonation method) and high temperature and high pressure method ND (i.e. ND produced by a high temperature and high pressure method) can be used. In an embodiment of the present invention, among these, from the viewpoint of superior dispersibility, i.e. from the viewpoint of making the particle diameter of the primary particle be in a single-digit nanometer, a detonation ND is preferred.

The detonation ND includes air-cooling detonation ND (i.e. ND produced by an air-cooling detonation method) and water-cooling detonation ND (i.e. ND produced by a water-cooling detonation method). In an embodiment of the present invention, among these, the air-cooling detonation ND is preferred from the viewpoint of obtaining smaller primary particles compared to the case of the water-cooling detonation ND.

In the surface-modified ND according to an embodiment of the present invention, the group represented by Formula (1) above modifies a hydrophilic surface of an ND particle. The surface-modified ND according to an embodiment of the present invention having the surface modifying group can exhibit excellent dispersibility because the aggregation of ND particles is suppressed by the steric hindrance of the surface modifying group, compared to the case of ND particles having no surface modifying groups.

Furthermore, the group represented by Formula (1) above has excellent affinity for an organic solvent and a resin. Therefore, the surface-modified ND according to an embodiment of the present invention having the group represented by Formula (1) above as the surface modifying group exhibits high dispersibility without aggregation in an organic solvent and in a resin.

Among the surface-modified NDs according to an embodiment of the present invention, in particular, an ND having the surface modifying group which is represented by Formula (1) and in which $R^1$ in Formula (1) is an aliphatic hydrocarbon group having 14 or more carbons (most preferably an alkyl group having 14 or more carbons, and especially preferably an alkyl group having from 14 to 25 carbons) has excellent re-dispersibility in an organic solvent. For example, when a liquid component in an ND liquid dispersion formed by a production method described below is removed (e.g. removed by a method such as vaporization to dryness performed by using an evaporator) to form powder of the surface-modified NDs, an organic solvent is then added to the powdered surface-modified NDs, and ultrasonic treatment or the like is performed as necessary, the surface-modified NDs can be highly dispersed again in the organic solvent. The particle diameter of the surface-modified NDs in the ND-redispersed liquid formed as described above (median diameter; hereinafter also referred to as "D50") is, for example, 100 nm or less, preferably 60 nm or less, particularly preferably 50 nm or less, and most preferably 30 nm or less. The lower limit of the particle diameter (D50) of the surface-modified NDs is, for example, 10 nm. Note that the particle diameter (D50) of the surface-modified NDs according to an embodiment of the present invention can be measured by dynamic light scattering.

Nanodiamond Liquid Dispersion

The nanodiamond liquid dispersion (ND liquid dispersion) according to an embodiment of the present invention includes an organic solvent and the surface-modified nanodiamonds.

The organic solvent is a dispersion medium for dispersing the surface-modified NDs. Examples thereof include aliphatic hydrocarbons, such as hexane, heptane, and octane (especially, straight-chain saturated aliphatic hydrocarbons); aromatic hydrocarbons, such as benzene, toluene, and xylene; alicyclic hydrocarbons, such as cyclohexane and methylcyclohexane; aprotic polar solvents, such as dimethylformamide (DMF), dimethylacetamide, N-methylpyrrolidone, and dimethyl sulfoxide; halogenated hydrocarbons, such as chloroform, dichloromethane, dichloroethane, carbon tetrachloride, chlorobenzene, and trifluoromethylbenzene; linear or cyclic ethers, such as diethyl ether, diisopropyl ether, dimethoxyethane, tetrahydrofuran, and dioxane; and esters, such as ethyl acetate and butyl acetate. One type alone or two or more types thereof in combination can be used. In an embodiment of the present invention, among these, aliphatic hydrocarbons (especially, straight-chain saturated aliphatic hydrocarbons) and aromatic hydrocarbons are preferred from the viewpoint of particularly excellent dispersibility of the surface-modified NDs, and aromatic hydrocarbons are particularly preferred.

The concentration (solid content concentration) of the surface-modified NDs in the ND liquid dispersion is, for example, from 0.0001 to 10 mass %.

Therefore, the content of the dispersion medium in the ND liquid dispersion is, for example, from 90 to 99.9999 mass %, and the content of the organic solvent in the dispersion medium is, for example, 50 mass % or greater, preferably 80 mass % or greater, and particularly preferably 90 mass % or greater. Note that the upper limit is 100 mass %.

Furthermore, the ND liquid dispersion according to an embodiment of the present invention may include one type or two or more types of other components besides the surface-modified NDs and the organic solvent described above. The content of such other components (in the case where two or more types are included, a total amount thereof) is, for example, 30 mass % or less, preferably 20 mass % or less, particularly preferably 10 mass % or less, most preferably 5 mass % or less, and especially preferably 1 mass % or less, based on the total amount of the ND liquid dispersion. Note that the lower limit is 0 mass %. Therefore, the total content of the surface-modified NDs and the organic solvent described above is, for example, 70 mass % or greater, preferably 80 mass % or greater, particularly preferably 90 mass % or greater, most preferably 95 mass % or greater, and especially preferably 99 mass % or greater, based on the total amount of the ND liquid dispersion.

The ND liquid dispersion according to an embodiment of the present invention includes the surface-modified NDs in a highly dispersed state. The particle diameter (D50) of the surface-modified NDs in the ND liquid dispersion according to an embodiment of the present invention is, for example, 100 nm or less, preferably 60 nm or less, particularly preferably 50 nm or less, and most preferably 30 nm or less. The lower limit of the particle diameter (D50) of the surface-modified NDs is, for example, 10 nm.

For example, the ND liquid dispersion according to an embodiment of the present invention can be suitably used as an imparting agent for imparting the characteristics of the ND (e.g. mechanical strength, high refractive index, thermal conductivity, insulating properties, antioxidation properties, crystallization promoting action, and the like) to a resin or the like (e.g. heat- or photo-curable resins, thermoplastic resins, and the like). In addition, the ND liquid dispersion can be also suitably used as an antifriction agent or a lubricant applied to a sliding member or the like of a machine component (e.g. automobiles, aircrafts, and the like).

Method of Producing Surface-Modified Nanodiamond and Nanodiamond Liquid Dispersion The nanodiamond liquid dispersion according to an embodiment of the present invention can be produced by, while ND particles in an organic solvent are subjected to ultrasonic treatment in the presence of a grinding media, reacting a compound represented by Formula (3) below as a silane coupling agent with the ND particles (modification).

[Chemical Formula 7]

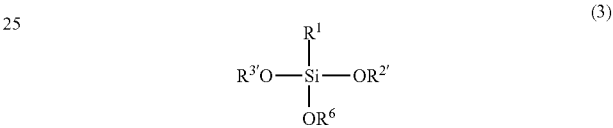

(3)

In Formula (3), $R^1$ represents an aliphatic hydrocarbon group having 6 or more carbons. $R^{2'}$, $R^{3'}$, and $R^6$ may be the same or different and each represent an aliphatic hydrocarbon group having from 1 to 3 carbons.

$R^1$ in Formula (3) represents an aliphatic hydrocarbon group having 6 or more carbons, and corresponds to $R^1$ in Formula (1). $R^{2'}$, $R^{3'}$, and $R^6$ may be the same or different and each represent an aliphatic hydrocarbon group having from 1 to 3 carbons. Examples of the aliphatic hydrocarbon group having from 1 to 3 carbons include those exemplified for $R^2$ and $R^3$ in Formula (1).

In an embodiment of the present invention, since the compound represented by Formula (3) above is used as a silane coupling agent, and in the compound, the $OR^{2'}$ group, the $OR^{3'}$ group, and the $OR^6$ group in Formula (3) are easily hydrolyzed to form silanol groups, one of the silanol groups undergoes dehydration condensation with a hydroxy group present on the surface of the ND particles to form a covalent bond, and the other two silanol groups can undergo condensation with a silanol group of another silane coupling agent to form a siloxane bond (Si—O—Si), for example. Therefore, steric hindrance sufficient to suppress aggregation of the ND particles can be achieved on the surface of the ND particles, and excellent dispersibility can be exhibited.

The reaction between the ND particles and the silane coupling agent is performed in the presence of an organic solvent while the ND particles are ground or dispersed.

As the organic solvent, an organic solvent used for the ND liquid dispersion described above can be suitably used.

Examples of the method of grinding or dispersing the ND particles include methods that process the ND particles by high shear mixers, high shear mixers, homo mixers, ball mills, bead mills, high pressure homogenizers, ultrasonic homogenizers, colloid mills, jet mills, and the like. In an embodiment of the present invention, among these, ultrasonic treatment in the presence of a grinding media (e.g. zirconia beads) is preferred. The ultrasonic treatment produces cavitation (microbubbles), and the jet blast produced at the time of breakage of the cavitation provides the grinding media with a significantly great kinetic energy. Then, the grinding media collides with the ND particles and gives impact energy to grind or disperse the ND particles. In the case where the ND particles includes ND agglutinates formed by agglutination of the ND particles, the ND agglutinates can be ground to form primary particles, the surface of the ND primary particles can be modified, and surface-modified NDs having excellent dispersibility can be obtained.

The diameter of the grinding media (e.g. zirconia beads) is, for example, from 15 to 500 µm, preferably from 15 to 300 µm, and particularly preferably from 15 to 100 µm.

The ratio of the ND particles to the silane coupling agent (ND particles:silane coupling agent, weight ratio) supplied for the reaction is, for example, 2:1 to 1:20. Furthermore, the concentration of the ND particles in the organic solvent is, for example, from 0.5 to 10 wt. %, and the concentration of the silane coupling agent in the organic solvent is, for example, from 5 to 40 wt. %.

The reaction time is, for example, from 4 to 20 hours. Furthermore, the reaction is preferably performed while generated heat is removed by using ice water or the like.

By the reaction described above, an ND liquid dispersion in which the surface-modified NDs are dispersed in the organic solvent can be obtained. Note that, in the case where ND agglutinates remain after completion of the reaction, after the liquid formed after the completion of the reaction is left to stand, the supernatant is preferably collected and used as an ND liquid dispersion.

The ND liquid dispersion formed as described above preferably includes the ND in a primary particle state. In addition, secondary particles in which a few to dozens of the primary particles are aggregated may be included.

Furthermore, the particle diameter (D50) of the surface-modified NDs in the ND liquid dispersion formed as described above is, for example, 100 nm or less, preferably 70 nm or less, more preferably 60 nm or less, and even more preferably 50 nm or less. The lower limit of the particle diameter (D50) of the surface-modified NDs is, for example, 10 nm.

When the ND liquid dispersion formed in this process is dried in the similar manner to the drying described above, the surface-modified ND can be formed as powder.

In the modification described above, the ND particles used in the reaction with the silane coupling agent can be produced by, for example, a detonation method.

The detonation method includes an air-cooling detonation method and a water-cooling detonation method. In an embodiment of the present invention, among these, the air-cooling detonation method is preferred from the viewpoint of obtaining ND having smaller primary particles compared to the case of the water-cooling detonation method.

Furthermore, the detonation can be performed in the air atmosphere or may be performed in an inert gas atmosphere, such as a nitrogen atmosphere, an argon atmosphere, a carbon dioxide atmosphere.

An example of the production method of the ND particles is described below; however, the ND particles used in an embodiment of the present invention are not limited to those formed by the following production method.

Formation

In the case where the ND is produced by the air-cooling detonation method in an inert gas atmosphere, first, an electric detonator is attached to a molded explosive and then placed inside a pressure-resistant container for detonation, and the container is sealed in a state in which a gas having the atmospheric composition under normal pressure and the explosive to be used coexist inside the container. The container is made of iron, for example, and the volume of the container is, for example, from 0.5 to 40 m$^3$. A mixture of trinitrotoluene (TNT) and cyclotrimethylenetrinitramine, which is also known as hexogen (RDX), can be used as the explosive. The mass ratio (TNT/RDX) of TNT to RDX is, for example, in a range from 40/60 to 60/40.

In the formation, the electric detonator is ignited, and the explosive is detonated in the container. "Detonation" refers to, among explosive reactions associated with chemical reactions, one that includes a flame surface where the reaction occurs traveling at a high speed exceeding the speed of sound. During the detonation, the explosive that is used undergoes partially incomplete combustion and releases carbon, the carbon thereof is used as a raw material to produce NDs by the action of the pressure and energy of the shock waves that are produced in the explosion. The produced NDs are subjected to Coulomb interaction between crystal planes, in addition to van der Waals force between adjacent primary particles or crystallites, and as a result, the products aggregate very firmly to form aggregates.

In the formation, next, the container and its interior are left to stand for approximately 24 hours at room temperature, thereby allowed to be cooled. After this cooling, the ND crude product can be recovered by scraping with a spatula the ND crude product (including soot and the ND aggregates produced as described above) deposited on the inner wall of the container. The crude product of ND particles can be formed through the method described above.

Acid Treatment

The acid treatment is a process that allows a strong acid to act on the ND crude product, which is a raw material, for example, in an aqueous solvent to remove the metal oxide. The ND crude product formed by the detonation method is prone to inclusion of a metal oxide, and the metal oxide is an oxide of Fe, Co, Ni, or the like resulting from the container or the like used in the detonation method. The metal oxide can be dissolved and removed from the ND crude product by allowing a predetermined strong acid to act thereon in an aqueous solvent, for example. The strong acid used in the acid treatment is preferably a mineral acid, and examples thereof include hydrochloric acid, hydrofluoric acid, sulfuric acid, nitric acid, and mixtures thereof. The concentration of the strong acid used in the acid treatment is, for example, from 1 to 50 mass %. The temperature for acid treatment is from 70 to 150° C., for example. The duration of the acid treatment is, for example, from 0.1 to 24 hours. Furthermore, the acid treatment can be performed under reduced pressure, at normal pressure, or under pressurization. After such acid treatment, the solid content (including ND agglutinates) is preferably washed with water by, for example, decantation until the pH of the precipitate liquid becomes 2 to 3. If the content of the metal oxide in the ND crude product formed by the detonation method is small, the acid treatment such as that described above may be omitted.

Oxidation Treatment

The oxidation treatment is a process to remove graphite from the ND crude product by using an oxidizing agent. The ND crude product formed by the detonation method includes graphite, and this graphite is derived from carbon that did not form ND crystals, among the carbons released by partially incomplete combustion of the used explosive. For example, the graphite can be removed from the ND crude product by allowing a predetermined oxidizing agent to act thereon in an aqueous solvent after the acid treatment described above. Furthermore, by allowing the oxidizing agent to act thereon, an oxygen-containing group, such as a carboxyl group and a hydroxy group, can be introduced onto the ND surface.

Examples of the oxidizing agent used in the oxidation treatment include chromic acid, chromic anhydride, dichromic acid, permanganic acid, perchloric acid, nitric acid, mixtures of these, mixed acids of at least one type selected from these and another acid (e.g. sulfuric acid), and salts of these. In an embodiment of the present invention, among these, use of a mixed acid (especially, a mixed acid of sulfuric acid and nitric acid) is preferred from the viewpoint of environmental friendliness and excellent action of oxidizing and removing the graphite.

The mixed ratio of the sulfuric acid to the nitric acid (sulfuric acid/nitric acid; mass ratio) in the mixed acid of, for example, from 60/40 to 95/5 is preferred from the viewpoint of efficiently oxidizing and removing the graphite at a temperature of, for example, 130° C. or higher (particularly preferably 150° C. or higher; note that, for example, the upper limit is 200° C.) in a pressure around normal pressure (e.g. 0.5 to 2 atm). The lower limit is preferably 65/35, and particularly preferably 70/30. Furthermore, the upper limit is preferably 90/10, particularly preferably 85/15, and most preferably 80/20.

When the proportion of the nitric acid in the mixed acid is greater than the range described above, the content of the sulfuric acid having a high boiling point becomes smaller. Therefore, in the pressure around normal pressure, the reaction temperature becomes, for example, 120° C. or lower, and the efficiency of graphite removal tends to decrease. On the other hand, when the proportion of the nitric acid in the mixed acid is less than the range described above, the content of the nitric acid, which contributes to the oxidation of the graphite significantly, becomes smaller, and the efficiency of graphite removal tends to decrease.

The amount of the oxidizing agent (especially, the mixed acid) used is, for example, from 10 to 50 parts by mass, preferably from 15 to 40 parts by mass, and particularly preferably from 20 to 40 parts by mass, relative to 1 part by mass of the ND crude product. Furthermore, the amount of the sulfuric acid used in the mixed acid is, for example, from 5 to 48 parts by mass, preferably from 10 to 35 parts by mass, and particularly preferably from 15 to 30 parts by mass, relative to 1 part by mass of the ND crude product. The amount of the nitric acid used in the mixed acid is, for example, from 2 to 20 parts by mass, preferably from 4 to 10 parts by mass, and particularly preferably from 5 to 8 parts by mass, relative to 1 part by mass of the ND crude product.

Furthermore, when the mixed acid is used as the oxidizing agent, a catalyst may be used together with the mixed acid. The use of a catalyst can further enhance the efficiency of graphite removal. Examples of the catalyst include copper (II) carbonate. The amount of the catalyst used is, for example, approximately from 0.01 to 10 parts by mass per 100 parts by mass of the ND crude product.

The temperature for oxidation treatment is, for example, from 100 to 200° C. The duration of the oxidation treatment is, for example, from 1 to 24 hours. The oxidation treatment can be performed under reduced pressure, at normal pressure, or under pressurization.

Alkali and Hydrogen Peroxide Treatment

In the case where the metal oxide is not completely removed and remains in the ND even after the process described above, agglutinates (secondary particles) in which primary particles are extremely strongly interacted and clustered are formed. In such a case, a predetermined alkali and hydrogen peroxide may be allowed to act on the NDs in an aqueous solvent. Consequently, the metal oxide remained in the ND can be removed, and separation of the primary particles from the agglutinates can be promoted. Examples of the alkali used in this treatment include sodium hydroxide, ammonia, and potassium hydroxide. In this treatment, the concentration of the alkali is, for example, from 0.1 to 10 mass %, the concentration of hydrogen peroxide is, for example, from 1 to 15 mass %, the treatment temperature is, for example, from 40 to 100° C., and the duration for the treatment is, for example, from 0.5 to 5 hours. Furthermore, the treatment can be performed under reduced pressure, at normal pressure, or under pressurization.

Drying

In the present method, next, dying is preferably performed. For example, after a liquid component is vaporized from the ND-containing solution formed by the process described above, by using a spray dryer, an evaporator, or the like, the resulting residual solid component was dried by heating in an oven for drying. The temperature for heat drying is, for example, from 40 to 150° C. Through such drying, the ND agglutinates (agglutinates of the ND particles) can be formed as powder.

Resin Dispersion

The resin dispersion of an embodiment of the present invention includes a resin and the surface-modified NDs described above. The surface-modified NDs are preferably included in a state in which the surface-modified NDs are dispersed in the resin (particularly in a state in which the surface-modified NDs are highly dispersed in the resin).

Examples of the resin include heat- or photo-curable resins and thermoplastic resins.

Examples of the heat- or photo-curable resins include epoxy resins, acrylic resins, polyimide resins, phenol resins, and melamine resins. Furthermore, examples of the thermoplastic resins include nylon resins, polyethylene terephthalate (PET), polybutylene terephthalate (PBT), and polyimide (PI). One type alone or two or more types thereof in combination can be used. Furthermore, these resins may use monomers, oligomers, and polymers.

In the case where the heat- or photo-curable resin is used as the resin, a resin dispersion can be formed by mixing the heat- or photo-curable resin with the surface-modified NDs or the ND liquid dispersion described above. Furthermore, the obtained resin dispersion can form a cured product including the surface-modified NDs in a highly dispersed state through curing (or polymerization) of the heat- or photo-curable resin by subjecting the obtained resin dispersion to heat treatment or photoirradiation treatment.

In the case where the thermoplastic resin is used as the resin, a resin dispersion can be formed by blending the surface-modified NDs or the ND liquid dispersion described above with the thermoplastic resin in a heated and melted state. Furthermore, the obtained resin dispersion can form a solidified product including the surface-modified NDs in a highly dispersed state by cooling.

The content of the surface-modified NDs in the resin dispersion of an embodiment of the present invention is not particularly limited and is, for example, from approximately 10 to 0.0001 mass %, and preferably from 1 to 0.001 mass %, based on the amount of the resin.

The resin dispersion according to an embodiment of the present invention can include various additives as necessary, besides the resin and the surface-modified NDs. Examples of the additive include flame retardants, stabilizers, ultraviolet absorbers, photostabilizers, antistatic agents, conductivity imparting agents, lubricants, fillers, dispersing agents, releasing agents, foaming agents, coloring agents, various inorganic substances (silica, metal fine particles, and the like), and fillers (nanocarbon materials and the like).

The resin dispersion according to an embodiment of the present invention includes the surface-modified NDs in a highly dispersed and uniform state, and thus, in the case where a transparent resin is used, the transparency of the resin is not impaired and is maintained even in the resulting resin dispersion.

The resin dispersion of an embodiment of the present invention can be suitably used as a material for forming various articles (e.g. functional hybrid materials, thermally functional materials (heat resistant, heat storing, heat conductive, and heat insulating materials, and the like), photonics materials (organic EL elements, LEDs, liquid crystal displays, optical disks, and the like), bio/biocompatible materials, catalysts, coating materials, polishing materials, films (e.g. hard coating films for touchscreen, various displays, and the like, thermal barrier films), sheets, screens (e.g. transmission type transparent screens), fillers (e.g. fillers for heat radiation or for enhancing mechanical strength) thermal stabilizers, and heat resistant plastic substrate materials (for flexible displays)) to which characteristics of the ND (e.g. mechanical strength, high refractive index, thermal conductivity, insulating properties, antioxidation properties, and crystallization promoting action) are desirably imparted.

EXAMPLES

Hereinafter, the present invention will be described more specifically with reference to examples, however, the present invention is not limited by these examples. Note that the values in Examples and Comparative Examples were measured by the following methods.
Solid Content Concentration The solid content concentration in the ND liquid dispersion was calculated based on a weighed value of a liquid dispersion weighed to be from 3 to 5 g, and a weighed value of a dried product (powder) remained after a dispersion medium was vaporized from the weighed liquid dispersion by heating, weighed by precision balance.
Particle Diameter D50

The particle diameter (D50) of the ND included in the ND liquid dispersion was a particle diameter at 50% integrated value of particle size distribution obtained by measuring the particle size distribution of the NDs through dynamic light scattering (non-contact backscattering) using an instrument (trade name "Zetasizer Nano ZS"), available from Malvern Instruments Ltd.

Example 1

The ND liquid dispersion and the surface-modified ND were produced by the following processes.
Formation In the formation, first, an electric detonator was attached to a molded explosive, and then placed inside a pressure-resistant container for detonation, and the container was sealed. The container was made of iron, and the volume of the container was 15 $m^3$. As the explosive, 0.50 kg of a mixture of TNT and RDX was used. The mass ratio (TNT/RDX) of the TNT and RDX in the explosive was 50/50. Next, the electric detonator was ignited, and the explosive was detonated in the container. Subsequently, the container and its interior were left to stand for 24 hours at room temperature, and were thereby cooled. After this cooling, the ND crude product was recovered by scraping with a spatula the ND crude product (including soot and aggregates of the ND particles produced by the detonation method described above) deposited on the inner wall of the container.
Acid Treatment Next, the ND crude product formed by performing the formation described above multiple times was subjected to an acid treatment. Specifically, 6 L of 10 mass % hydrochloric acid was added to 200 g of the ND crude product to prepare a slurry, and the slurry was subjected to a heating treatment for 1 hour under reflux at the normal pressure condition. The heating temperature in this acid treatment was from 85 to 100° C. Next, after cooling, the solid content (including ND agglutinates and soot) was washed with water by decantation. Washing of the solid content by decantation was repeated until the pH of the precipitate liquid reached 2 from the low pH side.
Oxidation Treatment The oxidation treatment was then performed. Specifically, 6 L of a 98 mass % aqueous sulfuric acid solution and 1 L of a 69 mass % aqueous nitric acid solution were added to the precipitate liquid (including ND agglutinates) prepared through decantation after the acid treatment to prepare a slurry, and subsequently, the slurry was heated under reflux for 48 hours at the normal pressure condition. The heating temperature in this oxidation treatment was from 140 to 160° C. Next, after cooling, the solid content (including ND agglutinates) was washed with water by decantation. The initial supernatant liquid from the water washing was colored, and therefore the washing of the solid content by decantation was repeated until the supernatant liquid became visually clear.
Drying Next, a dried powder was obtained by subjecting the precipitate liquid (including ND agglutinates) prepared by decantation after the oxidation treatment to drying treatment. As a technique for the drying treatment, evaporation to dryness through the use of an evaporator was adopted.
Modification In a reaction vessel, 0.15 g of the ND agglutinates obtained in the drying was weighed, and 15 mL of toluene and 1 g of octadecyltrimethoxysilane (available from Tokyo Chemical Industry Co., Ltd.) as a silane coupling agent were added thereto and agitated for 10 minutes. After the agitation, 36 g of zirconia beads (trade name "YTZ", available from Tosoh Corporation; diameter: 30 μm) was added. After the addition, the ND particles and the silane coupling agent were subjected to ultrasonic treatment for 8 hours using an ultrasonic dispersing machine (model "UH-600S", available from SMT Co., Ltd.) under cooling in ice water, in a condition where a tip of an oscillator of the ultrasonic dispersing machine is immersed in the solution in the reaction vessel. Thus, the ND particles and the silane coupling agent were reacted. The mixture was initially gray; however, the particle diameter gradually became smaller, and the dispersion state became better. Finally, the mixture became a uniform, black liquid. It is conceived that ND particles are sequentially disintegrated from the ND agglutinates (disintegration), the disaggregated ND particles are subjected to the action of the silane coupling agent and bonded with the silane coupling agent. Thus, the surface-modified ND particles are stably dispersed in the toluene solvent. The ND liquid dispersion (1) was thus obtained. The particle diameter (D50) of the surface-modified ND particles in the obtained ND liquid dispersion (1) was 23 nm.

Furthermore, the obtained ND liquid dispersion (1) was allowed to stand for a whole day and night, and the supernatant liquid was collected. Then, into methanol (25 mL), 15 mL of the supernatant liquid was added dropwise. The supernatant liquid that was added dropwise was turned from black to gray. The liquid was treated by a centrifuge at 20000 G for 10 minutes to recover precipitated surface-modified NDs. After recovered, the surface-modified NDs were dried using a warm air drier at 60° C. for a whole day and night to obtain surface-modified ND powder (1).

The surface-modified ND powder (1) was redispersed in toluene to the solid content of 1 wt. % to obtain an ND-redispersed liquid (1). The appearance of the ND-redispersed liquid (1) was black, and the surface-modified NDs were stably and highly dispersed in the toluene solvent. Furthermore, the particle diameter (D50) of the surface-modified ND particles in this ND-redispersed liquid (1) was 25 nm.

Example 2

An ND liquid dispersion (2) and an ND-redispersed liquid (2) were obtained by performing the procedure similar to Example 1 except for using hexadecyltrimethoxysilane as the silane coupling agent in the modification and changing the duration of the ultrasonic treatment to 7 hours.

The particle diameter (D50) of the surface-modified ND particles in the ND liquid dispersion (2) was 24 nm.

Furthermore, the appearance of the ND-redispersed liquid (2) was black, and the surface-modified NDs were stably and highly dispersed in the toluene solvent. The particle diameter (D50) of the surface-modified ND particles in the ND-redispersed liquid (2) was 22 nm.

Example 3

An ND liquid dispersion (3) and an ND-redispersed liquid (3) were obtained by performing the procedure similar to Example 1 except for using dodecyltrimethoxysilane as the silane coupling agent in the modification.

The particle diameter (D50) of the surface-modified ND particles in the ND liquid dispersion (3) was 21 nm.

Furthermore, the appearance of the ND-redispersed liquid (3) was gray, and the surface-modified NDs underwent secondary aggregation in the toluene solvent. The particle diameter (D50) of the surface-modified ND particles in the ND-redispersed liquid (3) was 141 nm.

Example 4

An ND liquid dispersion (4) and an ND-redispersed liquid (4) were obtained by performing the procedure similar to Example 1 except for using n-octyltrimethoxysilane as the silane coupling agent in the modification and changing the duration of the ultrasonic treatment to 10 hours.

The particle diameter (D50) of the surface-modified ND particles in the ND liquid dispersion (4) was 25 nm.

Furthermore, the appearance of the ND-redispersed liquid (4) was gray, and the surface-modified NDs underwent secondary aggregation in the toluene solvent. The particle diameter (D50) of the surface-modified ND particles in the ND-redispersed liquid (4) was 230 nm.

Comparative Example 1

When the procedure similar to Example 1 except without using grinding media in the modification was performed, even when the ultrasonic treatment for 8 hours was performed, the mixed solution (including the ND agglutinates and the silane coupling agent) stayed gray and turbid, which was the initial color, and the ND agglutinates did not disperse in the toluene solvent but precipitated.

Comparative Example 2

When the procedure similar to Example 1 except for using no silane coupling agent in the modification was performed, even when the ultrasonic treatment for 8 hours was performed, the mixed solution (including the ND agglutinates and the silane coupling agent) stayed gray and turbid, which was the initial color, and the ND agglutinates did not disperse in the toluene solvent but precipitated.

To summarize the above, configurations of the present invention and variations thereof will be described below.

[1] A surface-modified nanodiamond having a structure in which a surface of a nanodiamond particle is modified by a group represented by Formula (1) below.

[Chemical Formula 8]

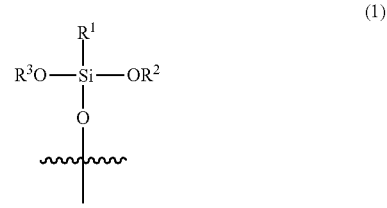

(1)

In Formula (1), $R^1$ represents an aliphatic hydrocarbon group having 6 or more carbons, an atomic bond indicated by a wavy line bonds to the surface of the nanodiamond particle, and $R^2$ and $R^3$ may be the same or different and are each a hydrogen atom, an aliphatic hydrocarbon group having from 1 to 3 carbons, or a group represented by Formula (2) below.

[Chemical Formula 9]

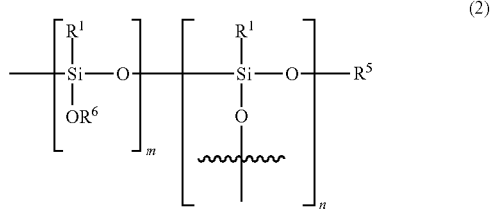

(2)

In Formula (2), $R^1$ is as described above. $R^5$ and $R^6$ may be the same or different and each represent a hydrogen atom or an aliphatic hydrocarbon group having from 1 to 3 carbons. m and n may be the same or different and each represent an integer of 0 or greater. Note that an atomic bond extending toward left from a silicon atom bonds to an oxygen atom. Furthermore, a bonding site indicated by a wavy line bonds to the surface of the nanodiamond particle.

[2] The surface-modified nanodiamond according to [1], wherein $R^1$ is an aliphatic hydrocarbon group having 6 or more carbons and is selected from the group consisting of straight-chain or branched alkyl groups; straight-chain or branched alkenyl groups; and straight-chain or branched alkynyl groups; the straight-chain or branched alkyl groups are selected from the group consisting of a hexyl group, an octyl group, a 2-methylhexyl group, a decyl group, an isodecyl group, a lauryl group, a myristyl group, an isomyristyl group, a butyloctyl group, an isocetyl group, a hexyldecyl group, a stearyl group, an isostearyl group, an octyldecyl group, an octyldodecyl group, and an isobehenyl group; the straight-chain or branched alkenyl groups are selected from the group consisting of a 2-hexenyl group, a 7-octenyl group, a 9-decenyl group, an 11-dodecenyl group, and an oleyl group; and the straight-chain or branched alkynyl groups are selected from the group consisting of a decynyl group, a pentadecynyl group, and an octadecynyl group.

[3] The surface-modified nanodiamond according to [1] or [2], wherein the aliphatic hydrocarbon groups having from 1 to 3 carbons for $R^2$, $R^3$, $R^5$, and $R^6$ are each selected from the group consisting of straight-chain or branched alkyl groups; straight-chain or branched alkenyl groups; and alkynyl groups; the straight-chain or branched alkyl groups are selected from the group consisting of a methyl group, an ethyl group, a propyl group, and an isopropyl group; the straight-chain or branched alkenyl groups are selected from the group consisting of a vinyl group and an allyl group; and the alkynyl groups are selected from the group consisting of an ethynyl group and a propynyl group.

[4] The surface-modified nanodiamond according to any one of [1] to [3], wherein the nanodiamond particle includes a primary particle of the nanodiamond particle.

[5] The surface-modified nanodiamond according to any one of [1] to [4], wherein the nanodiamond particle is detonation nanodiamond which is a nanodiamond produced by a detonation method or a high temperature and high pressure method nanodiamond which is a nanodiamond produced by a high temperature and high pressure method.

[6] The surface-modified nanodiamond according to [5], wherein the detonation method is an air-cooling detonation method or a water-cooling detonation method.

[7] The surface-modified nanodiamond according to any one of [1] to [6], wherein a particle diameter (median diameter, D50) of the surface-modified nanodiamond in a nanodiamond-redispersed liquid as measured by dynamic light scattering is 100 nm or less, 60 nm or less, 50 nm or less, 30 nm or less, or 10 nm.

[8] A nanodiamond liquid dispersion including an organic solvent and the surface-modified nanodiamond described in any one of [1] to [7].

[9] The nanodiamond liquid dispersion according to [8], wherein the organic solvent is selected from the group consisting of aliphatic hydrocarbons, aromatic hydrocarbons, alicyclic hydrocarbons, aprotic polar solvents, halogenated hydrocarbons, linear or cyclic ethers, and esters; the aliphatic hydrocarbons are selected from the group consisting of hexane, heptane, and octane; the aromatic hydrocarbons are selected from the group consisting of benzene, toluene, and xylene; the alicyclic hydrocarbons are selected from the group consisting of cyclohexane and methylcyclohexane; the aprotic polar solvents are selected from the group consisting of dimethylformamide (DMF), dimethylacetamide, N-methylpyrrolidone, and dimethyl sulfoxide; the halogenated hydrocarbons are selected from the group consisting of chloroform, dichloromethane, dichloroethane, carbon tetrachloride, chlorobenzene, and trifluoromethylbenzene; the linear or cyclic ethers are selected from the group consisting of diethyl ether, diisopropyl ether, dimethoxyethane, tetrahydrofuran, and dioxane; and the esters are selected from the group consisting of ethyl acetate and butyl acetate.

[10] The nanodiamond liquid dispersion according to [8] or [9], wherein the organic solvent is an aromatic hydrocarbon.

[11] The nanodiamond liquid dispersion according to any one of [8] to [10], wherein a median diameter of the surface-modified nanodiamond included in the organic solvent is 100 nm or less.

[12] A nanodiamond liquid dispersion including a dispersion medium and the surface-modified nanodiamond described in any one of [1] to [7].

[13] The nanodiamond liquid dispersion according to [12], wherein a content of the dispersion medium in the nanodiamond liquid dispersion is from 90 to 99.9999 mass %, the dispersion medium includes an organic solvent, and a content of the organic solvent in the dispersion medium is 50 mass % or greater, 80 mass % or greater, 90 mass % or greater, or 100 mass %.

[14] The nanodiamond liquid dispersion according to any one of [8] to [13], wherein a concentration (solid content concentration) of the surface-modified nanodiamond in the nanodiamond liquid dispersion is from 0.0001 to 10 mass %.

[15] The nanodiamond liquid dispersion according to any one of [8] to [14], wherein, besides the surface-modified nanodiamond and the organic solvent, one type or two or more types of other components are included, and a content of such other component(s) (total amount in the case where two or more types are included) is 30 mass % or less, 20 mass % or less, 10 mass % or less, 5 mass % or less, or 1 mass % or less, based on the total amount of the nanodiamond liquid dispersion.

[16] The nanodiamond liquid dispersion according to any one of [8] to [15], wherein a total content of the surface-modified nanodiamond and the organic solvent is 70 mass % or greater, 80 mass % or greater, 90 mass % or greater, 95 mass % or greater, or 99 mass % or greater, based on the total amount of the nanodiamond liquid dispersion.

[17] The nanodiamond liquid dispersion according to any one of [8] to [16], wherein a particle diameter (D50) of the surface-modified nanodiamond in the nanodiamond liquid dispersion is 100 nm or less, 60 nm or less, 50 nm or less, or 30 nm or less, and the lower limit of the particle diameter is 10 nm.

[18] A formulation including the nanodiamond liquid dispersion described in any one of [8] to [17] which is used for imparting mechanical strength, high refractive index, thermal conductivity, insulating properties, antioxidation properties, or crystallization promoting action to a photocurable resin or a thermoplastic resin.

[19] A formulation including the nanodiamond liquid dispersion described in any one of [8] to [17] which is used as an antifriction agent or a lubricant applied for a sliding member or the like of a machine component, including automobiles and aircrafts.

[20] A method of producing a nanodiamond liquid dispersion, the method including:

while nanodiamond particles in an organic solvent are subjected to ultrasonic treatment in the presence of a grinding media, reacting a compound represented by Formula (3) below with the nanodiamond particles to produce the nanodiamond liquid dispersion described in any one of [8] to [17].

[Chemical Formula 10]

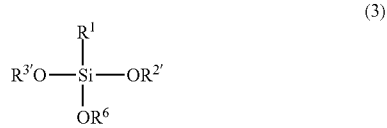

(3)

In Formula (3), $R^1$ represents an aliphatic hydrocarbon group having 6 or more carbons. $R^{2'}$, $R^{3'}$, and $R^6$ may be the same or different and each represent an aliphatic hydrocarbon group having from 1 to 3 carbons.

[21] The method of producing the nanodiamond liquid dispersion according to [20], wherein the organic solvent is selected from the group consisting of aliphatic hydrocarbons; aromatic hydrocarbons; alicyclic hydrocarbons; aprotic polar solvents; halogenated hydrocarbons; linear or cyclic ethers; and esters; the aliphatic hydrocarbons are selected from the group consisting of hexane, heptane, and octane; the aromatic hydrocarbons are selected from the group consisting of benzene, toluene, and xylene; the alicyclic hydrocarbons are selected from the group consisting of cyclohexane and methylcyclohexane; the aprotic polar solvents are selected from the group consisting of dimethylformamide (DMF), dimethylacetamide, N-methylpyrrolidone, and dimethyl sulfoxide; the halogenated hydrocarbons are selected from the group consisting of chloroform, dichloromethane, dichloroethane, carbon tetrachloride, chlorobenzene, and trifluoromethylbenzene; the linear or cyclic ethers are selected from the group consisting of diethyl ether, diisopropyl ether, dimethoxyethane, tetrahydrofuran, and dioxane; and the esters are selected from the group consisting of ethyl acetate and butyl acetate.

[22] The method of producing the nanodiamond liquid dispersion according to [20] or [21], wherein the grinding media is zirconia beads having a diameter of 15 to 500 μm, 15 to 300 μm, or 15 to 100 μm.

[23] A method of producing the nanodiamond liquid dispersion according to any one of [20] to [22], wherein $R^1$ is an aliphatic hydrocarbon group having 6 or more carbons and is selected from the group consisting of straight-chain or branched alkyl groups; straight-chain or branched alkenyl groups; and straight-chain or branched alkynyl groups; the straight-chain or branched alkyl groups are selected from the group consisting of a hexyl group, an octyl group, a 2-methylhexyl group, a decyl group, an isodecyl group, a lauryl group, a myristyl group, an isomyristyl group, a butyloctyl group, an isocetyl group, a hexyldecyl group, a stearyl group, an isostearyl group, an octyldecyl group, an octyldodecyl group, and an isobehenyl group; the straight-chain or branched alkenyl groups are selected from the group consisting of a 2-hexenyl group, a 7-octenyl group, a 9-decenyl group, an 11-dodecenyl group, and an oleyl group; and the straight-chain or branched alkynyl groups are selected from the group consisting of a decynyl group, a pentadecynyl group, and an octadecynyl group.

[24] A method for producing the nanodiamond liquid dispersion according to any one of [20] to [23], wherein the aliphatic hydrocarbon groups having from 1 to 3 carbons for $R^{2'}$, $R^{3'}$, and $R^6$ are each selected from the group consisting of straight-chain or branched alkyl groups; straight-chain or branched alkenyl groups; and alkynyl groups; the straight-chain or branched alkyl groups are selected from the group consisting of a methyl group, an ethyl group, a propyl group, and an isopropyl group; the straight-chain or branched alkenyl groups are selected from the group consisting of a vinyl group and an allyl group; and the alkynyl groups are selected from the group consisting of an ethynyl group and a propynyl group.

[25] A resin dispersion including a resin and the surface-modified nanodiamond described in any one of [1] to [7].

[26] The resin dispersion according to [25], wherein the resin is selected from the group consisting of heat- and photo-curable resins and thermoplastic resins; the heat- and photo-curable resins are selected from the group consisting of epoxy resins, acrylic resins, polyimide resins, phenol resins, and melamine resins, and the thermoplastic resins are selected from the group consisting of nylon resins, polyethylene terephthalate (PET), polybutylene terephthalate (PBT), and polyimide (PI).

[27] The resin dispersion according to [25] or [26], wherein a content of the surface-modified nanodiamond in the resin dispersion is from 10 to 0.0001 mass % or from 1 to 0.001 mass % relative to an amount of the resin.

INDUSTRIAL APPLICABILITY

Since the surface-modified nanodiamond according to an embodiment of the present invention has a surface modifying group derived from a silane coupling agent having an aliphatic hydrocarbon group having 6 or more carbons on its surface, the surface-modified nanodiamond exhibits excellent dispersibility in an organic solvent and in a resin.

In particular, a surface-modified nanodiamond having a surface modifying group derived from a silane coupling agent having an aliphatic hydrocarbon having 14 or more carbons exhibits excellent dispersibility and re-dispersibility in an organic solvent and in a resin.

Furthermore, the nanodiamond liquid dispersion according to an embodiment of the present invention formed by allowing the surface-modified nanodiamonds to be highly dispersed in an organic solvent can be suitably used as an imparting agent that imparts the characteristics of the nanodiamond (e.g. mechanical strength, high refractive index, thermal conductivity, insulating properties, antioxidation properties, crystallization promoting action, and the like) to a resin or the like, or an antifriction agent or a lubricant applied to a sliding member or the like of a machine component (e.g. automobiles, aircrafts, and the like).

Furthermore, by the production method according to an embodiment of the present invention, the nanodiamond liquid dispersion can be efficiently produced.

Furthermore, the resin dispersion formed by allowing the surface-modified nanodiamonds having excellent dispersibility as described above to be dispersed in a resin can be suitably used as a material for forming various products that are required to have characteristics of the nanodiamond because, in the case where the resin is transparent, the resin dispersion can exhibit characteristics of the nanodiamond while the transparency is maintained.

REFERENCE SIGNS LIST

1 Surface-modified nanodiamond
2 Nanodiamond particle (part)
3 Surface modifying group
4 Long-chain aliphatic hydrocarbon group

The invention claimed is:
1. A nanodiamond liquid dispersion comprising:
a surface-modified nanodiamond in a concentration of 0.0001 to 10 mass %; and
an organic solvent in a content of 90 mass % or greater, the surface-modified nanodiamond and the organic solvent being present in a total content of 95 mass % or greater, wherein the surface-modified nanodiamond have a structure in which a surface of a nanodiamond particle is modified by a group represented by Formula (1):

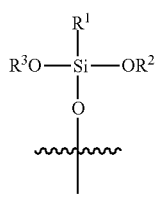
(1)

where $R^1$ represents an aliphatic hydrocarbon group having 6 or more carbons, an atomic bond indicated by a wavy line bonds to the surface of the nanodiamond particle, and $R^2$ and $R^3$ may be the same or different and are each a hydrogen atom, an aliphatic hydrocarbon group having from 1 to 3 carbons, or a group represented by Formula (2):

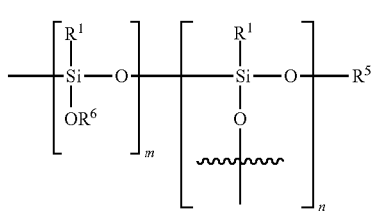
(2)

where $R^1$ is as described above, $R^5$ and $R^6$ may be the same or different and each represent a hydrogen atom or an aliphatic hydrocarbon group having from 1 to 3 carbons, m and n may be the same or different and each represent an integer of 0 or greater, an atomic bond extending toward left from a silicon atom bonds to an oxygen atom, and an atomic bond indicated by a wavy line bonds to the surface of the nanodiamond particle.

2. The nanodiamond liquid dispersion according to claim 1, wherein the organic solvent is an aromatic hydrocarbon.

3. The nanodiamond liquid dispersion according to claim 1, wherein a median diameter of the surface-modified nanodiamond included in the organic solvent is 100 nm or less.

4. The nanodiamond liquid dispersion according to claim 1, wherein the nanodiamond liquid dispersion has properties below:

in a case where a liquid component is removed from the nanodiamond liquid dispersion to produce a powdered surface-modified nanodiamond and the powdered surface-modified nanodiamond is redispersed in the organic solvent to prepare a nanodiamond liquid dispersion having a solid content concentration of 1 wt. %, a particle diameter (D50) of the surface-modified nanodiamond in the prepared nanodiamond liquid dispersion is from 10 to 100 nm.

5. The nanodiamond liquid dispersion according to claim 2, wherein a median diameter of the surface-modified nanodiamond included in the organic solvent is 100 nm or less.

6. A nanodiamond liquid dispersion according to claim 1, wherein $R^1$ in formula (1) is an alkyl group having from 14 to 25 carbons.

7. The nanodiamond liquid dispersion according to claim 6, wherein a median diameter of the surface-modified nanodiamond included in the organic solvent is 100 nm or less.

8. The nanodiamond liquid dispersion according to claim 6, wherein a concentration of the surface-modified nanodiamond is from 0.0001 to 10 mass %.

9. The nanodiamond liquid dispersion according to claim 6, wherein the nanodiamond liquid dispersion has properties below:

in a case where a liquid component is removed from the nanodiamond liquid dispersion to produce a powdered surface-modified nanodiamond and the powdered surface-modified nanodiamond is redispersed in the organic solvent to prepare a nanodiamond liquid dispersion having a solid content concentration of 1 wt. %, a particle diameter (D50) of the surface-modified nanodiamond in the prepared nanodiamond liquid dispersion is from 10 to 100 nm.

* * * * *